US012587396B2

(12) United States Patent
Stone et al.

(10) Patent No.: US 12,587,396 B2
(45) Date of Patent: Mar. 24, 2026

(54) SYSTEMS AND METHODS FOR RECOMMENDING NETWORK PROCESSING ROUTES WHEN CONDUCTING NETWORK OPERATIONS

(71) Applicant: Coinbase, Inc., Oakland, CA (US)

(72) Inventors: Dan Stone, Oakland, CA (US); John Granata, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 399 days.

(21) Appl. No.: 17/938,542

(22) Filed: Oct. 6, 2022

(65) Prior Publication Data

US 2024/0121114 A1    Apr. 11, 2024

(51) Int. Cl.
| | |
|---|---|
| *H04L 9/00* | (2022.01) |
| *H04L 45/12* | (2022.01) |
| *H04L 45/125* | (2022.01) |
| *H04L 45/44* | (2022.01) |
| *H04L 67/1097* | (2022.01) |

(52) U.S. Cl.
CPC .............. *H04L 9/50* (2022.05); *H04L 45/124* (2013.01); *H04L 45/125* (2013.01); *H04L 45/44* (2013.01); *H04L 67/1097* (2013.01)

(58) Field of Classification Search
CPC ..... H04L 9/50; H04L 67/1097; H04L 9/3239; H04L 45/12–126; H04L 45/38–44
See application file for complete search history.

(56) References Cited

U.S. PATENT DOCUMENTS

| | | | |
|---|---|---|---|
| 2017/0243177 A1* | 8/2017 | Johnsrud | ................. G06Q 20/10 |
| 2019/0278766 A1* | 9/2019 | Xia | ......................... H04L 9/3236 |

(Continued)

FOREIGN PATENT DOCUMENTS

| | | | | |
|---|---|---|---|---|
| WO | WO-2020223272 A1 * | 11/2020 | .......... | H04L 63/123 |
| WO | WO-2021121596 A1 * | 6/2021 | ............... | H04L 9/50 |

OTHER PUBLICATIONS

L. Kan, Y. Wei, A. Hafiz Muhammad, W. Siyuan, L. C. Gao and H. Kai, "A Multiple Blockchains Architecture on Inter-Blockchain Communication," 2018 IEEE International Conference on Software Quality, Reliability and Security Companion (QRS-C), Lisbon, Portugal, 2018, pp. 139-145 (Year: 2018).*

(Continued)

*Primary Examiner* — Patrice L Winder
(74) *Attorney, Agent, or Firm* — Foley & Lardner LLP

(57) ABSTRACT

Methods and systems are described herein for recommending network processing routes when conducting blockchain operations. For example, the system may receive a first user request to perform a first blockchain operation across one or more computer networks to access a first blockchain asset. The system may then determine a first processing characteristic for the first user request and a first plurality of locations of the first blockchain asset (e.g., across the one or more computer networks). The system may then determine a first plurality of network routes to a first subset of the first plurality of locations. The system may then filter the first plurality of network routes (e.g., based on the first processing characteristic) to generate a first subset of the plurality of network routes. Based on the first subset of the plurality of network routes, the system may generate a first recommendation for performing the blockchain operation.

19 Claims, 6 Drawing Sheets

100

(56) References Cited

U.S. PATENT DOCUMENTS

| | | | |
|---|---|---|---|
| 2019/0340586 A1* | 11/2019 | Sheng | G06Q 20/367 |
| 2019/0370809 A1* | 12/2019 | Hu | G06Q 20/10 |
| 2020/0076610 A1* | 3/2020 | Wang | H04L 9/0637 |
| 2020/0342539 A1* | 10/2020 | Doney | G06Q 40/06 |
| 2020/0396065 A1* | 12/2020 | Gutierrez-Sheris | H04L 9/3297 |
| 2021/0342838 A1* | 11/2021 | Hoggard | H04L 9/088 |
| 2022/0076250 A1* | 3/2022 | Gaur | G06Q 20/3829 |
| 2023/0186285 A1* | 6/2023 | Mawson | G06Q 20/381 705/40 |

OTHER PUBLICATIONS

Pupyshev, Aleksei, et al. "Graviton: interchain swaps and wrapped tokens liquidity incentivisation solution." arXiv preprint arXiv: 2009.05540 , 2020, 8 pages. (Year: 2020).*

* cited by examiner

100

300

<u>600</u>

Receive a first user request

602

Determine a processing characteristic

604

Determine a plurality of locations

606

Determine a plurality of network routes

608

Filter the plurality of network routes

610

Generate a recommendation

612

SYSTEMS AND METHODS FOR RECOMMENDING NETWORK PROCESSING ROUTES WHEN CONDUCTING NETWORK OPERATIONS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Systems and methods are described herein for novel uses and/or improvements to blockchains and blockchain technology. As one example, methods and systems are described herein for recommending network processing routes when conducting blockchain operations. In particular, the methods and systems feature a recommendation engine that determines the most efficient processing route (e.g., a route that has the lowest has fee, best price, etc.) for blockchain operations (e.g., cross-chain cryptocurrency exchanges, cross-chain crypto asset exchanges, etc.).

Conventional systems for performing cross-chain cryptocurrency or crypto asset exchanges typically involve the use of a cross-chain bridge which invokes one or more cryptocurrency or crypto asset liquidity pools. For example, conventional systems using such cross-chain bridges to perform such exchanges must provide a liquidity pool for each cryptocurrency or crypto asset being exchanged. However, as new cryptocurrencies (and derivative assets thereof) become available, conventional systems lack the corresponding liquidity pools and/or the resources to support them. Furthermore, intermediary pools and bridges lack oversights and transparency creating both technical and security barriers. This may lead to high latency, system downtime, or unfulfillable operations as such conventional systems struggle to find and/or create corresponding liquidity pools which may be associated with a high cost (e.g., higher transaction fees, higher gas fees, etc.).

To overcome these technical deficiencies in conventional systems, systems and methods disclosed herein provide a recommendation engine for recommending network processing routes when conducting blockchain operations. For example, the recommendation engine may receive requests to perform blockchain operations (e.g., cross-chain cryptocurrency exchanges) for a given blockchain asset (e.g., a given cryptocurrency) or a set of blockchain assets. The system may then determine what locations (e.g., entities, wallets, chains, pools, or other locations) are available to access the blockchain asset and/or whether these locations meet additional constrains or parameters specified in the request, such as know-your-customer ("KYC") requirements, cost, security, speed, or origin/destination chain requirements. Additionally or alternatively, the system may determine the most efficient processing route (e.g., a route that has the lowest gas fee, best price, etc.) for accessing the blockchain asset and/or location. Accordingly, the systems and method provide reduced system latency, downtime, and cost while maintaining blockchain operation security.

In some aspects, the system may receive a first user request to perform a first blockchain operation across one or more computer networks to access a first blockchain asset, where the one or more computer networks includes a decentralized computer network. The system may then determine a first processing characteristic for the first user request. The system may then determine a first plurality of locations of the first blockchain asset across the one or more computer networks. The system may then determine a first plurality of network routes to a first subset of the first plurality of locations. Based on the first processing characteristic, the system may filter the first plurality of network routes to generate a first subset of the plurality of network routes. A first recommendation may be generated on a first user device for performing the first blockchain operation based on the first subset of the plurality of network routes.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
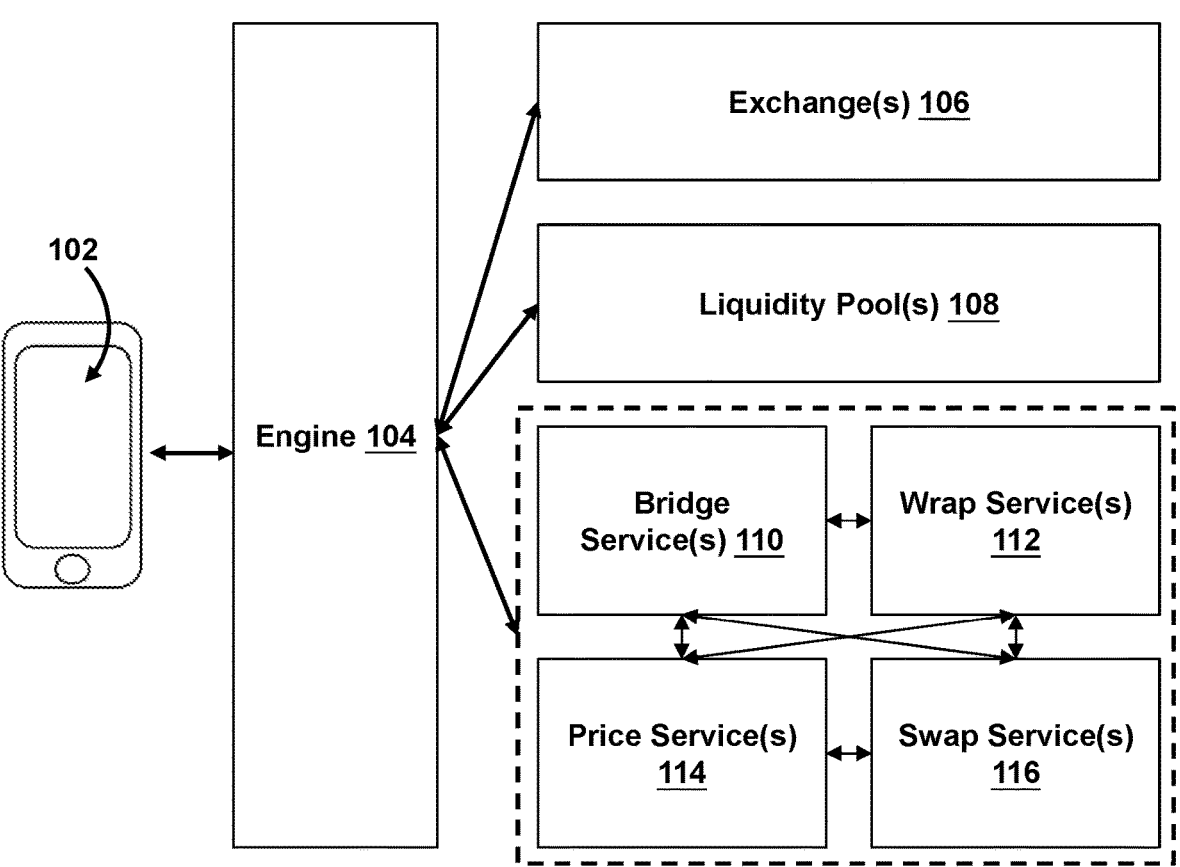
FIG. 1 shows an illustrative diagram for recommending network processing routes when conducting blockchain operations, in accordance with one or more embodiments.

FIG. 1 shows an illustrative diagram for recommending network processing routes when conducting blockchain operations, in accordance with one or more embodiments. For example, system 100 may indicate components such as user device 102, engine 104, exchange(s) 106, liquidity pool(s) 108, bridge service(s) 110, wrap service(s) 112, price service(s) 114, swap service(s) 116, or other components. For example, FIG. 1 illustrates a user device 102 interacting with engine 104 to recommend network processing routes when conducting blockchain operations. Engine 104 may interact with each of system exchange 106, liquidity pool 108, bridge service 110, wrap service 112, price service 114, and swap service 116 to determine the most efficient network processing route to access a blockchain asset. For example, engine 104 may receive a user request to perform a blockchain operation (e.g., to access a blockchain asset) from user device 102 and may determine a processing characteristic for the user request. Using, the processing characteristic, engine 104 may interact with each of components 106-116 to determine a plurality of network routes (e.g., to which the blockchain asset is accessible) and provide a recommendation for performing a blockchain operation. As such, the system may determine the most efficient network processing route to access the blockchain asset based on the processing characteristic—thereby reducing system latency and cost (e.g., to perform the blockchain operation).

As shown in FIG. 1, system 100 may include engine 104. For example, engine 104 may be a recommendation engine for recommending network processing routes when conducting blockchain operations. For example, in some embodiments, engine 104 may include one or more artificial intelligence models. In some embodiments, the artificial intelligence models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, a machine learning model (e.g., artificial intelligence model) may take in inputs and provide outputs. In one use case, outputs may be fed back to the machine learning model as input to train the machine learning model (e.g., alone or in conjunction with user indications of the accuracy of outputs, labels associated with the inputs, or with other reference feedback information). In another use case, the machine learning model may update its configurations (e.g., weights, biases, or other parameters) based on its assessment of its prediction (e.g., outputs) and reference feedback information (e.g., user indication of accuracy, reference labels, or other information). In another use case, where the machine learning model is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

In some embodiments, where the machine learning model is a neural network, the neural network may be trained based on training data comprising network characteristics, locations of blockchain assets, processing characteristics, (e.g., processing characteristics associated with a user request, parameters or other constraints specified in user requests, etc.) or other training data. For example, the neural network may take in (i) network characteristic(s), (ii) the locations of blockchain asset(s), or (ii) processing characteristic(s) as input, and generate an output. The output may comprise a set of network routes associated with accessing the blockchain asset(s). In some embodiments, the output may be fed back into the neural network to update one or more configurations (e.g., weighs biases, or other parameters based on its assessment of its prediction (e.g., output) and reference feedback information (e.g., user indication of accuracy, reference labels, or other information). In some embodiments, the reference feedback information may include blockchain operation result information (e.g., a result related to conducting one or more blockchain operations). For example, where the blockchain operation result information indicates that a specific Decentralized Exchange (DEX) aggregator on a given blockchain produces an error satisfying a threshold error value (e.g., meets or exceeds a threshold error value) when attempting to trade a given token, the machine learning model may use such reference feedback information to update one or more configurations based on such reference feedback information, thereby avoiding using that DEX aggregator to trade a given token. In this way, the machine learning model may generate more accurate predictions recommending network processing routes when conducting blockchain operations.

In some embodiments, exchange(s) 106 may include one or more digital asset exchanges (e.g., digital asset networks, digital asset exchanges, digital asset platforms, cryptocurrency networks, cryptocurrency exchanges, cryptocurrency platforms, etc.). For example, an exchange may refer to a platform where users may trade or purchase digital currencies, digital assets, cryptocurrencies, or other blockchain-related assets. Liquidity pool(s) 108 may include one or more digital asset liquidity pool networks. A liquidity pool may refer to a digital pile (or set) of digital assets within a smart contract. As such, the liquidity pools may allow the value (e.g., cost) of digital assets to be traded based on one or more mathematical conditions of the digital assets within the liquidity pool. Bridge service(s) 110 may include one or more digital asset bridge service networks. For example, a bridge service allows one or more digital asset networks (e.g., blockchains, blockchain networks, digital asset networks) to interact with one another where one network may or may not have the same digital asset protocol (e.g., token standard, consensus standard, etc.) with another network. As some blockchain-related networks may be incompatible with others (e.g., based on the differing protocols and standards), such bridge-services act in a cross-chain manner allowing networks to exchange information with one another when they normally would not be able to. Wrap service(s) 112 may include one or more digital asset wrapping networks. For example, a wrapping network may be a network that can "wrap" a token (e.g., a cryptocurrency) that is available on one blockchain/network to be used on another network that normally would not be able to "live" or be used on the other network. Wrapped tokens may have a 1:1 correspondence between a cryptocurrency on a first blockchain and the wrapped token on a second blockchain, and as such, may represent the original cryptocurrency (but may have a different token standard to be used on a blockchain different than that of the original blockchain the token was created on). Price service(s) 114 may include one or more digital asset price service networks. For example, price service networks may be blockchain networks, platforms, or other entities that may determine the price of one or more digital assets, blockchain assets, cryptocurrencies, or other blockchain-related assets. Lastly, swap service(s) 116 may include one or more digital asset swap service networks. For example, a swap service may be a digital asset network that may allow users to exchange, purchase, sell, or trade digital assets or cryptocurrencies.

The system may use a processing characteristic to filter a plurality of network routes. As referred to herein, a "processing characteristic" may include any characteristic that is related to performing a blockchain operation. In some embodiments, the processing characteristic may comprise a max gas fee. In some embodiments, the processing characteristic may comprise a known entity (e.g., a specific network). In some embodiments, the processing characteristic may comprise a maximum slippage. In some embodiments, the processing characteristic may comprise a throughput speed for a blockchain operation. In some embodiments, the processing characteristic may comprise a user request to batch the first blockchain operation. In some embodiments, the processing characteristic may comprise a user request to batch the first blockchain operation in a batch of a given size.

In some embodiments, the system may determine the processing characteristic based on the user request. For example, by determining the processing characteristic based on the user request (e.g., a user input specifying the processing characteristic), the system may generate a recommendation for performing a blockchain operation that is the most efficient and consistent with the user's request. Additionally or alternatively, the system may determine the processing characteristic based on a predetermined processing characteristic. For example, the predetermined processing characteristic may be based on a set of historical user requests, where the predetermined processing characteristic is selected based on the highest value (e.g., percentage, number, etc.) of users selecting a given processing characteristic over all other processing characteristics available. As another example, the predetermined processing characteristic may be a default processing characteristic (e.g., set as default by the system). For example, the system may select a given process characteristic as a default processing characteristic (e.g., secure networks only, lowest overall cost). By using a predetermined processing characteristic, the system may generate a recommendation for performing a blockchain operation that is the most efficient when the user may not know which processing characteristic to select.

The system may filter the plurality of network routes to generate a subset of the plurality of network routes. As referred to herein, a "filtering" may include any filtering criteria for generating a subset of network routes (e.g., to access a blockchain asset). In some embodiments, the filtering may be based on a processing characteristic.

In some embodiments, the system may filter a plurality of network routes based on the use of a specific network. For example, by filtering the plurality of network routes based on the use of a specific network, the system may generate a recommendation that uses a specific network (e.g., such as a safe network). Additionally or alternatively, the system may generate the subset of network routes by filtering the set of network routes based on a maximum gas fee. For example, by filtering the set of network routes based on a maximum gas fee, the system may recommend a processing route that is associated with a reduced cost for performing the blockchain operation. Additionally or alternatively, the system may generate the subset of network routes by filtering the set of network routes based on a maximum slippage. For example, by filtering the set of network routes based on a maximum slippage, the system may generate a recommendation that is financially resilient. Additionally or alternatively, the system may generate the subset of network routes by filtering the set of network routes based on a throughput speed for a blockchain operation. For example, by filtering the set of network routes based on the throughput speed for the blockchain operation, the system may reduce system latency. Additionally or alternatively, the system may generate the subset of network routes by filtering the set of network routes based on batching the blockchain operation. For example, by filtering the set of network routes based on batching the blockchain operation (or batching based on a given size), the system may reduce the load on the network while also reducing network latency. Additionally or alternatively, the system may generate the subset of network routes by filtering the set of network routes based on a particular entity. For example, by filtering the set of network routes based on a particular entity, the system may increase blockchain operation security (e.g., where the particular entity is a safe or secure entity).

Figure 2:
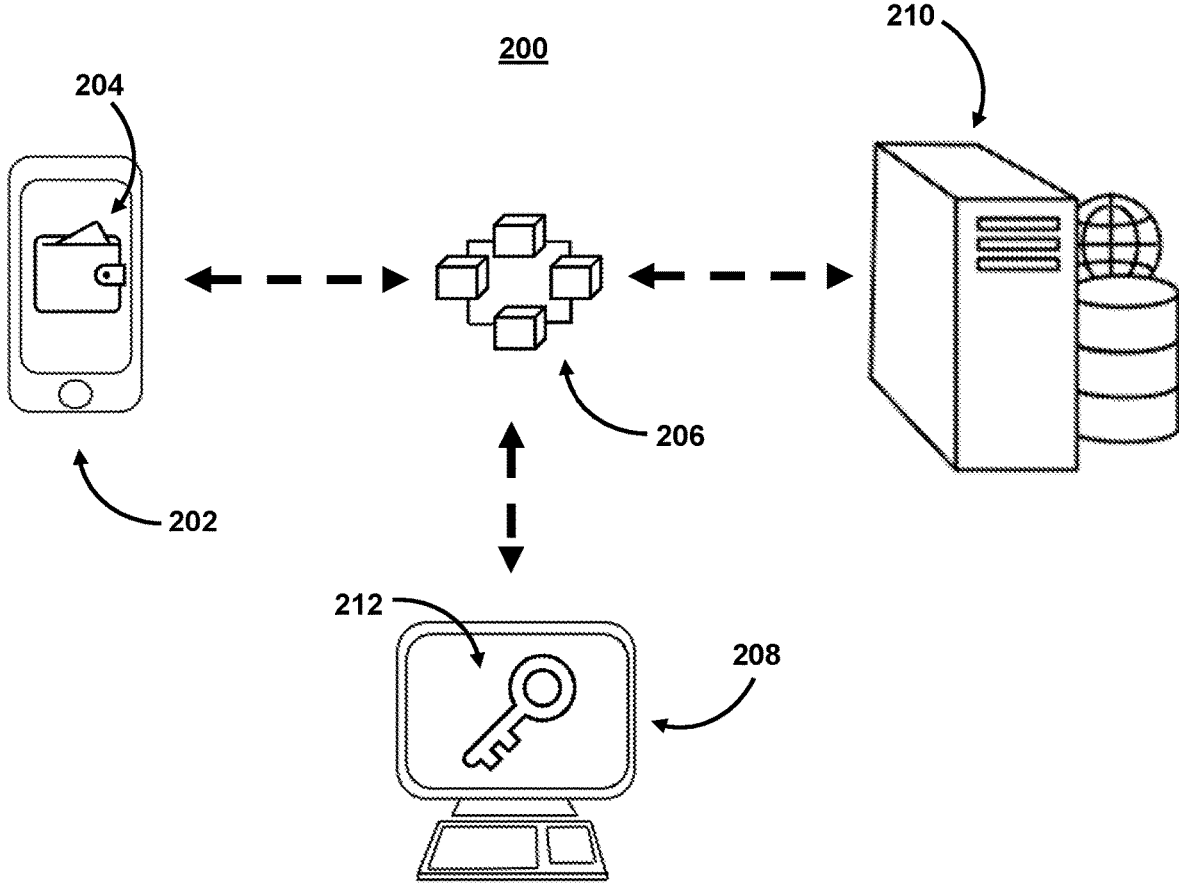
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to recommend network processing routes when conducting blockchain operations in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to provide recommendations for network processing routes when conducting blockchain operations, and the user interface may display content related to conducting blockchain operations (or recommendations of network processing routes thereof). As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to recommending network processing routes when conducting such blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a cryptography-based, storage application (e.g., digital wallet 204) used to perform blockchain operations. The cryptography-based, storage application may be used to perform a plurality of blockchain operations across a computer network. The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Digital wallet holders may hold both a hot wallet and a cold wallet. Hot wallets are most often used to perform blockchain operations, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain operations. In some embodiment, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

As shown in FIG. 2, one or more user devices may include a private key (e.g., key 212) and/or digital signature. For example, system 200 may use cryptographic systems for conducting blockchain operations. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
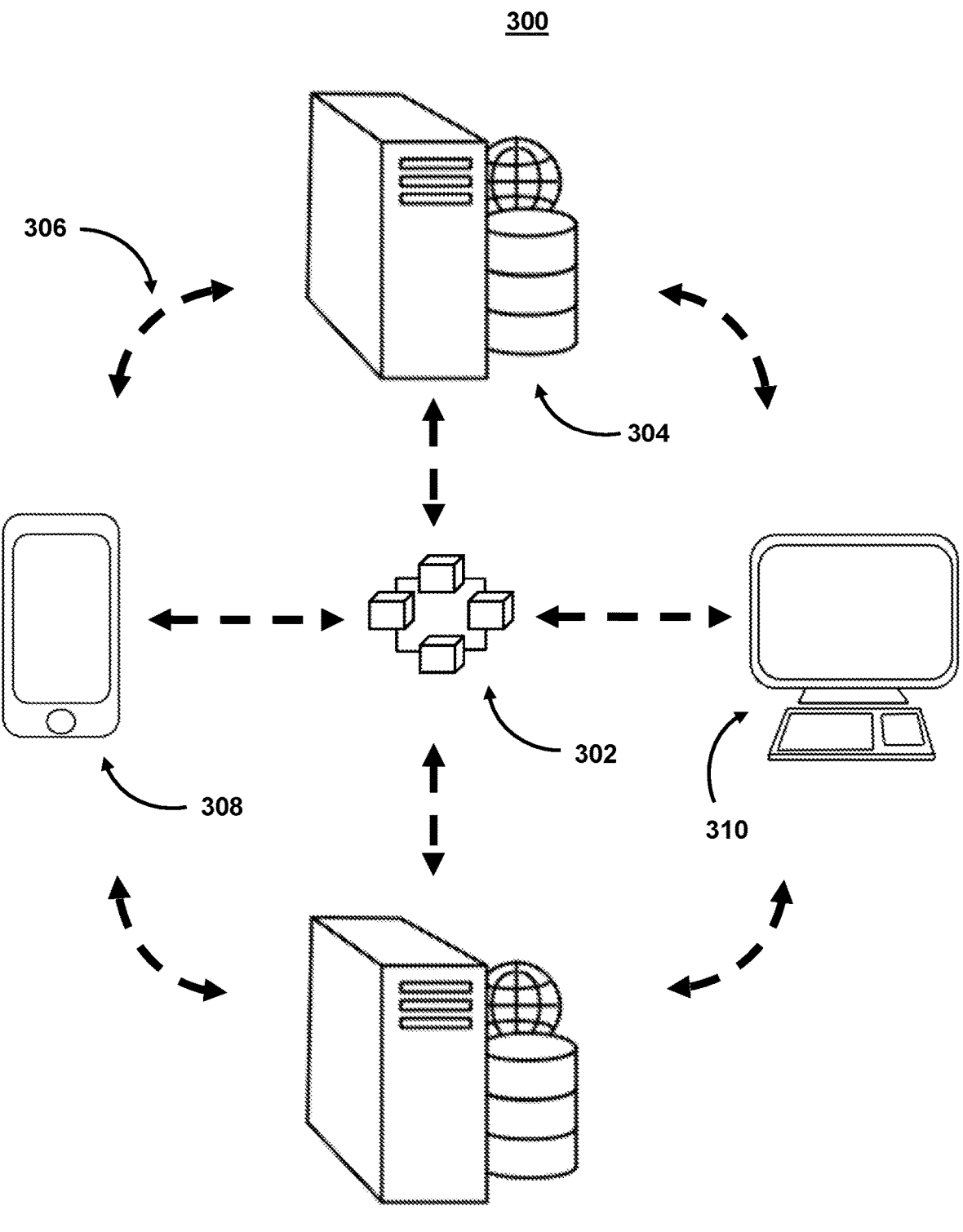
FIG. 3 shows an illustrative diagram for a decentralized application, in accordance with one or more embodiments.

FIG. 3 shows an illustrative diagram for a decentralized application, in accordance with one or more embodiments.

For example, in some embodiments, system 300 may recommend network processing routes when conducting blockchain operations within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to recommending network processing routes when conducting blockchain operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
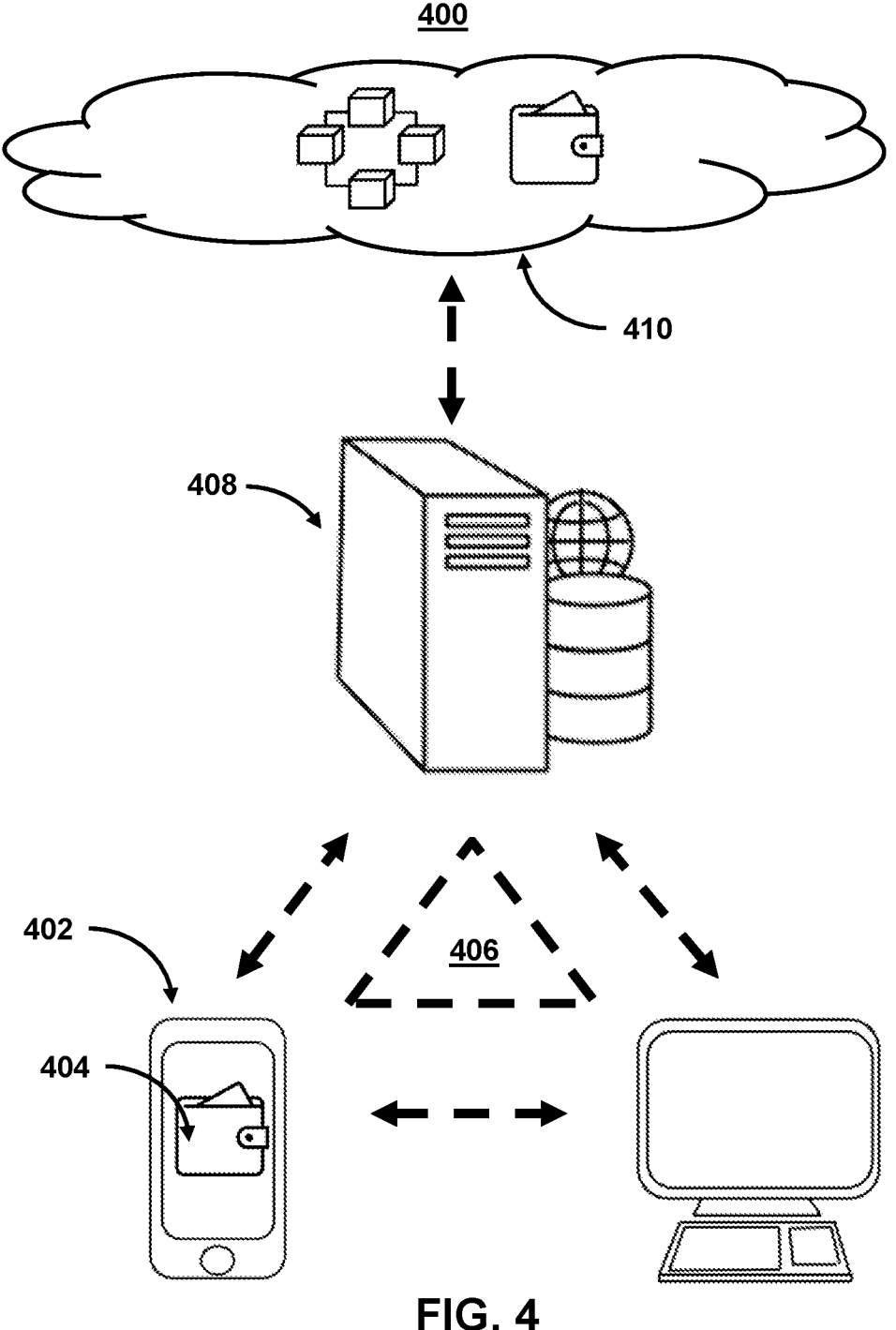
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to recommend network processing routes when conducting blockchain operations. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a representational state transfer (REST) or web services API layer) may provide a decoupled interface to data and/or functionality of one or more applications.

API layer 406 may provide various low-level and/or blockchain-specific operations in order to facilitate recommendations of network processing routes when conducting blockchain operations. For example, API layer 406 may provide blockchain operations such as blockchain writes. Furthermore, API layer 406 may perform a transfer valida- tion ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentral- ized applications and custodial user accounts. By doing so, the system maintains the security of sensitive information such as the balances and transaction history. Alternatively, a mechanism for maintaining such security would separate the API access between the decentralized applications and cus- todial user accounts through the use of special logic. The introduction of the special logic decreases the streamlining of the system, which may result in system errors based on divergence and reconciliation.

API layer 406 may provide a common, language-agnostic way of interacting with an application. In some embodi- ments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PUP, and JavaScript. Simple Object Access Protocol ("SOAP") web services have traditionally been adopted in the enterprise for publishing internal services as well as for exchanging infor- mation with partners in business-to-business ("B2B") trans- actions.

API layer 406 may use various architectural arrange- ments. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where micro- services reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized applica- tion environment. In some embodiments, the system archi- tecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an applica- tion and/or a software-based system that securely stores users' payment information, private keys, and/or passwords facilitating blockchain operations with websites, nodes, and/ or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires addi- tional processing and computational power.

Second, accounting changes in a blockchain architecture should be irreversible. This is achieved in practice for current blockchain operations by waiting for a variable number of confirmations from the blockchain (e.g., block- chain 410). By waiting for the variable number of confir- mations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Fur- thermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
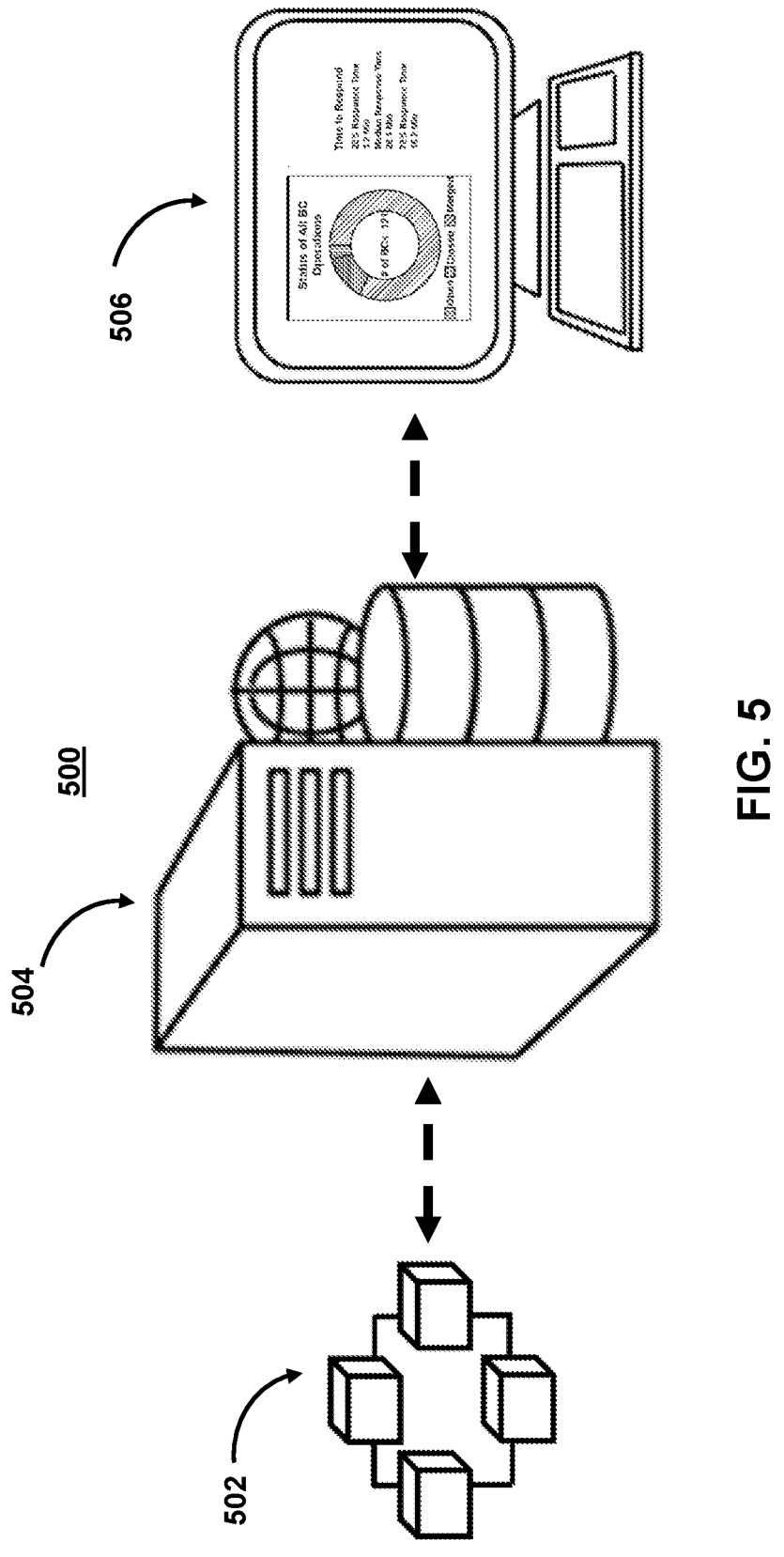
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to recommend network processing routes when conducting blockchain operations. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
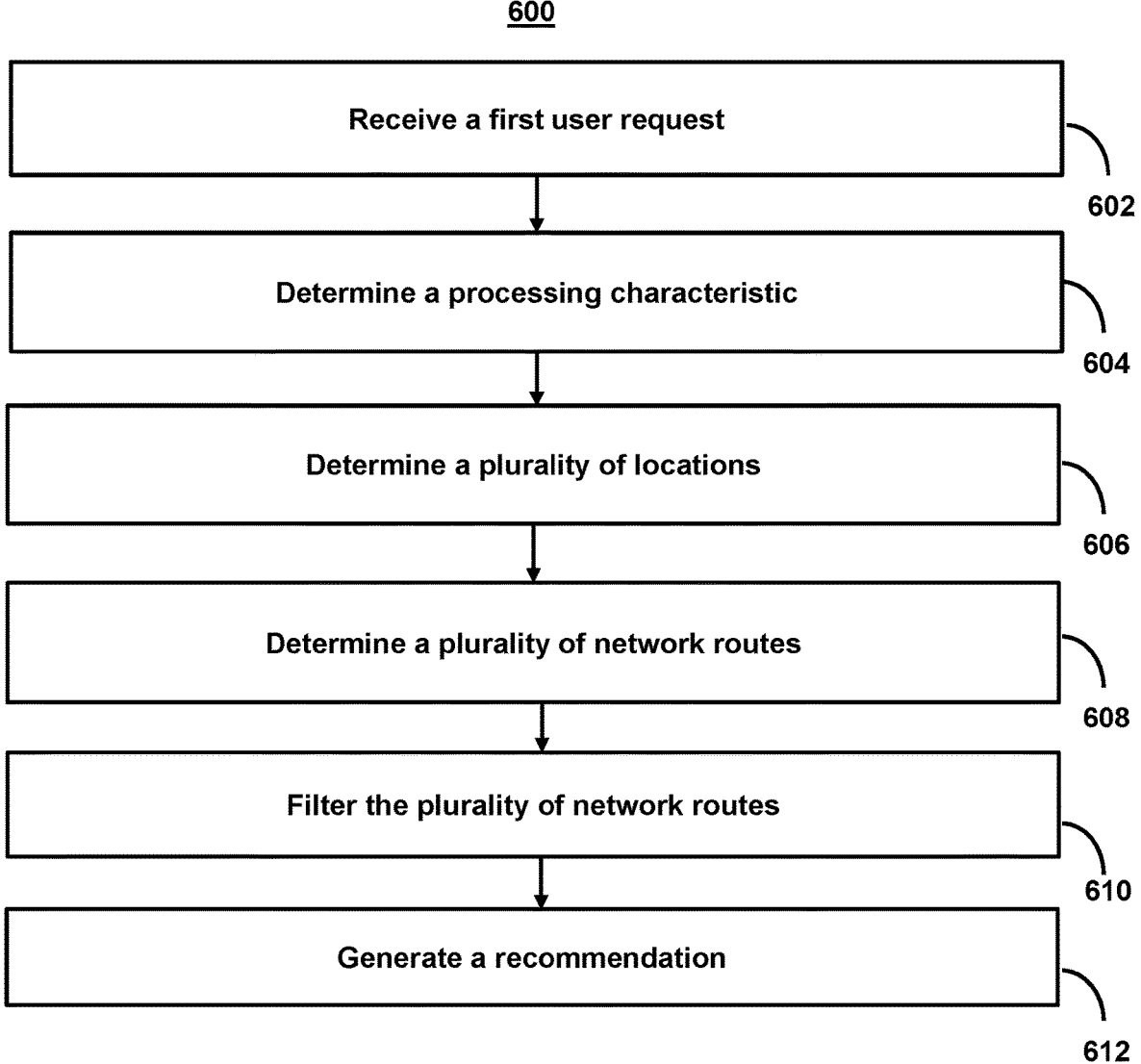
FIG. 6 shows a flowchart of the steps involved in recommending network processing routes when conducting blockchain operations, in accordance with one or more embodiments.

FIG. 6 shows a flowchart of the steps involved in recommending network processing routes when conducting blockchain operations, in accordance with one or more embodiments. For example, the system may use process 600 (e.g., as implemented on one or more system components described above) in order to determine the most efficient processing route for accessing a blockchain asset.

At step 602, process 600 (e.g., using one or more components described above) may receive a first user request. For example, the system may receive a first user request to perform a first blockchain operation across one or more computer networks to access a first blockchain asset. For example, the one or more computer networks may include a decentralized computer network (e.g., a blockchain network). The first user request may be a request to access a blockchain asset such as a cryptocurrency, an NFT (e.g., non-fungible token), utility token, security token, initial coin offerings, or other blockchain-related assets.

At step 604, process 600 (e.g., using one or more components described above) may determine a processing characteristic. For example, the system may determine a first processing characteristic for the first user request. The first processing characteristic for the first user request may be a throughput speed, use of a specific network, maximum gas fee, maximum slippage, a user request to batch the first blockchain operation (or batch the first blockchain operation in a batch of a given size), or other processing characteristic. In some embodiments, the system may determine a set of processing characteristics for the first user request. For example, the first user request may include one or more user-specified (or other default) processing characteristics, such as the use of a specific network, and a maximum slippage value. By doing so, the system may use the first processing characteristic (or set of processing characteristics) to filter network routes, thereby reducing cost of the blockchain operation, decreasing system latency, downtime, and maintaining blockchain operation security respective of the first processing characteristic.

In some embodiments, the first processing characteristic may be included in the user request. For example, the first processing may be specified by the user upon the user submitting the first user request. In a use case, when the user submits the first user request, the user may specify that the user is attempting to access (e.g., obtain, purchase, or otherwise access) an NFT with a max gas fee of 0.0015 ETH. Process 600 may parse through the first user request and determine the processing characteristic of "max gas fee of 0.0015 ETH." By doing so, the system may quickly determine the processing characteristic, thereby reducing the amount of computer processing resources required.

At step 606, process 600 (e.g., using one or more components described above) may determine a plurality of locations. For example, the system may determine a first plurality of locations of the first blockchain asset across the one or more computer networks. As a given blockchain asset may be available on a multitude of different networks, wallets, addresses, services, or exchanges, the system may determine each location that the blockchain asset is available through. By doing so, the system may determine a small set of locations where the first blockchain asset is available as opposed to considering all possible computer networks, thereby reducing the amount of computer processing resources required to generate network processing routes recommendations.

In some embodiments, the system may compare asset characteristics to characteristics of available blockchain assets to determine the first plurality of locations of the first blockchain asset. For example, the system may determine an asset characteristic for the first blockchain asset. For example, the system may use characteristics of different types of assets to locate the first blockchain asset. Such asset characteristics may correspond to an indicia that the asset is a wrapped token. A wrapped token may refer to a cryptocurrency that is available on a blockchain (or other decentralized computing network) that is different from the cryptocurrencies original blockchain. For example, due to interoperability of different cryptocurrency/token standards across varying computer networks, some tokens may not be available, "live," or able to be exchanged on a given computing network. Wrapped tokens may have a 1:1 correspondence between a cryptocurrency on a first blockchain and the wrapped token on a second blockchain, and as such, may represent the original cryptocurrency (but may have a different token standard to be used on a blockchain different than that of the original blockchain the token was created on). A benefit of wrapping tokens may be that a one computing network (or blockchain network) has reduced fees, an overall reduced cost, or decreased transaction latency as opposed to a second computing network. Thus, upon determining an asset characteristic for the first blockchain asset, process 600 may compare the asset characteristic to characteristics of available blockchain assets. As an example, by comparing the asset characteristic to characteristic of available blockchain assets (e.g., available at differing locations), the system may determine such locations of where the first blockchain asset (or similar asset with respect to the first blockchain asset, such as a wrapped token corresponding to the first blockchain asset) may be located. By doing so, the system may determine secondary locations which the first blockchain asset may exist, thereby providing a wider variety of locations to which the first blockchain asset may be accessed.

In some embodiments, the first plurality of locations may be filtered based on entity labels. For example, the system may retrieve known entity labels validated by a blockchain platform service and may filter the first plurality of locations based on the known entity labels (e.g., for the first plurality of locations) to generate the first subset of the first plurality of locations. For instance, some networks in which blockchain assets are available may be trustworthy and secure, whereas others are untrustworthy and unsecure. To maintain system security for performing blockchain operations, a blockchain platform service (e.g., a service that controls one or more blockchain operations, a service that is related to validating blockchain operations, etc.) may store information related to whether a blockchain entity (e.g., network, wallet, or other location hosting a blockchain asset) is a trusted entity, a security entity, or a valid/legitimate entity. The system may independently validate known entities and/or label known entities as such, and these labels may be used when determining locations to which a blockchain asset to be accessed is located. By doing so, the system may maintain a higher level of security by filtering out locations that may be accessed (e.g., for the blockchain asset) to only locations that are known/validated locations.

At step 608, process 600 (e.g., using one or more components described above) may determine a plurality of network routes. For example, the system may determine a first plurality of network routes to a first subset of the first plurality of locations. As the locations to which the first blockchain asset is available has been determined, accessing the blockchain asset may have differing routes available. For instance, a given blockchain asset may reside on two different blockchains (e.g., blockchain1 and blockchain2). However, to get to either of blockchain1 or blockchain2 (e.g., to access the blockchain asset), multiple blockchain operations may be required to take place (e.g., via one or more exchanges, liquidity pools, cross-chain bridges, wrapping services, swap services, price services, etc.). Process 600 may determine a first plurality of network routes to a first subset of the first plurality of locations to determine "how" to access the blockchain asset and, as will later be explained, which route is indeed the most efficient route to access the blockchain asset.

In some embodiments, determining a first plurality of network routes may be based on a plurality of orders. For example, the system may determine the first plurality of network routes to the first subset of the first plurality of locations by first determining a plurality of networks for use in performing blockchain operations across the one or more computer networks. The system may then generate a plurality of orders of the plurality of networks to the first subset of the first plurality of locations, and may filter the plurality of orders based on the first processing characteristic (e.g., as indicated via the user request). For example, when filtering available routes, the system may filter orders in which networks are used based on the processing characteristic. For example, the system may filter a first order of networks based on a max fee corresponding to using the first order to process a blockchain operation.

In some embodiments, determining a first plurality of network routes may be based on a determined series of operations. For example, to generate recommendations of network processing routes when conducting blockchain operations, multiple operations may need to take place to obtain a given blockchain asset. To effectively provide the "best" recommendation (e.g., related to one or more processing characteristics), operations such as a "bridge," "wrap," "swap," or "buy" may each be associated with their own fees, slippages, or other characteristics that may affect the efficiency of a network route. For example, each operation may be related to a service such as bridge service 110, wrap service 112, price service 114, swap service 116, or other components such as exchange 106 or liquidity pool 108 as shown in FIG. 1. As such, the system may determine network routes based on a determined series of operations that may be required to access a given blockchain asset. For example, using the plurality of locations (e.g., to which a blockchain asset to be accessed is located), the system may determine what operations may be required to take place to "get to" the plurality of locations. For example, the blockchain asset may reside on fourth chain, however, to access the blockchain asset, a first network route may need to access a first chain, a second chain, a third chain, and then finally the fourth chain (e.g., to access the blockchain asset). However, each of first, second, third, and fourth chain's may be associated with a particular protocol and each protocol may require a particular blockchain operation. For example, a blockchain protocol may be rule or a set of rules that govern a blockchain network that are associated with the interface of the network, interaction between computing devices, incentives, data type, etc. As such, continuing with the example, the system may determine a series of operations based on (i) the protocols associated with each chain and (ii) the plurality of locations (e.g., to which a blockchain asset to be accessed is located). For instance, to access a blockchain asset residing on the fourth chain, a trade operation may be called on a first protocol associated with the first chain, a wrap function may be called on a second protocol associated with the second chain, a bridge operation may be called on a third protocol associated with the third chain, and a buy operation may be called on a fourth protocol associated with the fourth chain (e.g., thereby accessing the blockchain asset). As each operation may be associated with specific fees, costs, slippages, or other characteristics, the system may store information pertaining to each operation's characteristics for later filtering of the network routes.

In some embodiments, determining a first plurality of network routes may be based on an artificial intelligence model. For example, determining a first plurality of network routes to the first subset of the first plurality of locations may be based on an artificial intelligence model. As discussed above, due the vast array of locations where blockchain assets reside, the numerous routes in which to access the blockchain asset, and the different transactions that must take place to access such assets, using one or more artificial intelligence models may be advantageous to determine different network routes to the locations. As such, the system may first determine a plurality of networks for use in performing blockchain operations across the one or more computer networks. For example, the system may determine the networks that are available to be used to access the blockchain asset.

In some embodiments, the system may generate a feature input for the artificial intelligence model. For example, the system may generate the feature input based on the plurality of networks. The system may first determine a plurality of network characteristics for the plurality of networks. Network characteristics may refer to the type of network a network is (e.g., an exchange, liquidity pool, bridge service, wrap service, price service, swap service, etc.), consensus protocols, token standards, asset type (e.g., cryptocurrency, NFT, token, etc.), security, transparency (e.g., transparency of fees), or other network-related characteristics. The system may then generate the feature input for the artificial intelligence model (e.g., engine 104), such as an array of values representing the plurality of network characteristics. For example, the array of values may be an array of numbers, alphanumeric characters, or other values configured to be inputted into an artificial intelligence model. In some embodiments, the artificial intelligence model may be a Neural Network (NN), a Recurrent Neural Network (RNN), Support Vector Machine (SVM), Convolutional Neural Network (CNN), a deep learning model, decision tree, logistic regression model, or other artificial intelligence model. In some embodiments, the feature input may be based on the network characteristics and the first plurality of locations (e.g., to which a blockchain asset resides). For example, the system may generate the feature input as an array of values representing (i) the network characteristics and (ii) the first plurality of locations. In this way, the feature input may be provided to the artificial intelligence model to determine a set of network routes associated with accessing the first blockchain asset.

In some embodiments, the system may input the feature input into the artificial intelligence model to generate an output. For example, the output may be a set of network routes associated with accessing the first blockchain asset. For instance, the output may include multiple network routes (e.g., including one or more networks) that the system may interact with to access the first blockchain asset. As such, the system may determine the first plurality of network routes to the first subset of the first plurality of locations based on the output. By using an artificial intelligence model to determine a set of network routes (e.g., to the first subset of the first plurality of locations), the system may reduce the cost of performing blockchain operations and improve the user experience as such determination may quickly identify available network routes to access a given blockchain asset.

In some embodiments, determining the first plurality of network routes to the first subset of the first plurality of locations may be based on a priority. For example, the system may first determine (i) a first plurality of networks and (ii) a second plurality of networks for use in performing blockchain operations across the one or more computer networks. The system may then prioritize use of the first plurality of networks to determine the first plurality of network routes to the first subset of the first plurality of locations. For example, the system may favor particular networks, accounts, entities, or other blockchain-related networks/location when determining a network route. For example, the first plurality of networks may indicate "favored" networks (e.g., trusted networks, secure networks, low-fee networks, etc.) and the second plurality of networks may indicate "unfavored" networks (e.g., not-trusted networks, unsecure networks, high-fee networks, etc.) As another example, the first plurality of networks may be networks that are associated with the processing characteristic (e.g., as determined from the user request) and the second plurality of networks may be networks that are not associated with the processing characteristic. In this way, the system may prioritize the use of certain networks, thereby maintaining blockchain operation security.

At step 610, process 600 may generate a first subset of the plurality of network routes. For example, the system may filter the first plurality of network routes based on the first processing characteristic to generate a first subset of the plurality of network routes. As discussed above, the processing characteristic may be related to the processing of the blockchain operation. For instance, to access a blockchain asset with the lowest overall cost, the system may filter the first plurality of network routes to determine the network route with the lowest overall cost. As another example, to access a blockchain asset with the fastest possible transaction speed (e.g., to avoid exchange slippage), the system may filter the first plurality of network routes to determine the shortest path (e.g., route) possible to access the blockchain asset. Although each of the first plurality of network routes may be a sufficient vehicle for accessing the blockchain asset, some of the network routes may not be suitable based on the user request. For example, the user request may specify a particular processing characteristic for performing the blockchain operation. As such, the system may filter the first plurality of network routes to generate a first subset of the plurality of network routes that are associated with the processing characteristic. By doing so, the system may generate a subset of network routes that may be suitable for the given user request—thereby reducing the amount of computer processing and computer memory resources required to generate a recommendation for performing the first blockchain operation.

In some embodiments, the system may filter the first plurality of network routes according to individual networks. For example, the system may determine a first network and a second network in the first plurality of network routes. The system may then filter the first network and the second network based on the first processing characteristic. For instance, each network route may include one or more networks (e.g., as the network route is a path to the blockchain asset). To illustrate, when accessing blockchain-asset-1, a network route may include network1, network2, and network 3. The blockchain operation may be a trade of blockchain-asset-2 (hosted on network1) for blockchain-asset-1 (hosted on network2). When the plurality of routes are determined, to perform the exchange (e.g., the user accessing blockchain-asset-1), blockchain-asset-2 must transverse network1, network2, and finally network3, where each transaction between network1-network2, and network2-network3 each are a different transaction. Thus, the system may filter each of network1, network2, and network 3 based on the first processing characteristic. For example, where the first processing characteristic is throughput speed (e.g., a minimum or maximum throughput speed) corresponding to each network (e.g., a speed at which new blocks on a network are confirmed/minted), each of the networks, network1, network2, and network 3 may be filtered based on the throughput speed characteristic. By doing so, the system may generate a small subset of network routes that are suitable based on the processing characteristic—thereby reducing the amount of computer processing resources and computer memory required to generate network processing route recommendations.

In some embodiments, filtering the first plurality of network routes may be based on a threshold ranking. For example, the system may filter the first plurality of network routes based on the first processing characteristic to generate the first subset of the plurality of network routes by ranking the first plurality of network routes based on the first processing characteristic. For instance, by ranking the first plurality of network routes based on the first processing characteristic, the system may generate a plurality of rankings. The system may then filter the plurality of rankings based on a threshold ranking to determine the first subset of the plurality of network routes. The threshold ranking may represent a predetermined value.

For example, where the processing characteristic is a maximum slippage, the system may rank each network route of the first plurality of network routes based on the maximum slippage. To illustrate, where the maximum slippage (e.g., indicated by the processing characteristic) is 0.5% of the first blockchain asset's value, a first network route may have a maximum slippage of 0.3% and a second network route may have a maximum slippage of 0.4%. The threshold ranking may be a slippage of 0.4% of the first blockchain asset's value. Thus, the system may rank the first network route and the second network route in a descending order corresponding to the processing characteristic (e.g., the first network route may be ranked first, and the second network route may be ranked second based on their respective maximum slippage). The system may then filter the rankings of the first and second network routes based on the threshold ranking to determine the first subset of network routes. As such, the first network route may be part of the first subset of network routes. By doing so, the system may determine the most efficient network routes with respect to the processing characteristic via the ranking—thereby providing the best recommendation for performing the first blockchain operation.

In some embodiments, filtering the first plurality of network routes may be based on the use of a given network. For example, the system may filter the first plurality of network routes based on the first processing characteristic to generate the first subset of the plurality of network routes by first determining a network corresponding to the first processing characteristic. The system may then filter the first plurality of network routes based on whether each of the network routes in the first plurality of network routes includes the network. As each network route (e.g., of the first plurality of network routes) may include different networks to "pass through" or transact with to obtain the first blockchain asset, some of these network routes may include networks that are unsafe to transact with (e.g., does not meet KYC requirements, fails to meet certain token protocols, etc.). Therefore, the first user request may specify the use of a particular network that is known to be safe to obtain the first blockchain asset. The system may determine the network (e.g., network name, network identifier, or other network-related information) the corresponds to the processing characteristic (e.g., denoting the particular network) and may filter each of the network routes to network routes that include the given network. By doing so, the system may ensure secure obtainment of the first blockchain asset by filtering network routes that include the indicated network.

In some embodiments, filtering the first plurality of network routes may be based on a maximum gas fee. For example, the system may filter the first plurality of network routes based on the first processing characteristic to generate the first subset of the plurality of network routes by first determining a maximum gas fee requirement corresponding to the first processing characteristic. As an example, the first processing characteristic may indicate a maximum gas fee of 0.00231 ETH. The system may then determine a respective maximum gas fee for each of the network routes in the first plurality of network routes. In one use case, where the first plurality of network routes comprises a first network route including a first network, and a second network route including a second network and a third network (e.g., to access the first blockchain asset), the system may determine the total gas fees required to obtain the first blockchain asset via each network route. As each network may use its own gas fees to complete a transaction over the network, the system may add the total gas fees required for each network route (e.g., respective of each network that is included in a given route). The system may then filter the first plurality of network routes based on the respective maximum gas fee to generate the first subset of the plurality of network routes. For example, the network routes that do not exceed the maximum gas fee (e.g., corresponding to the processing characteristic) may be included in the first subset of the plurality of network routes. By doing so, the system may select the network routes that are associated with the lowest gas fees—thereby improving the user experience while reducing the amount of computer processing and computer memory resources required to provide a recommendation to the user (e.g., by reducing the amount of network routes available to be recommended to the user).

In some embodiments, filtering the first plurality of network routes may be based on a maximum slippage. For example, the system may filter the first plurality of network routes based on the first processing characteristic to generate the first subset of the plurality of network routes by first determining a maximum slippage requirement corresponding to the first processing characteristic. As an example, the first processing characteristic may indicate a maximum slippage of 0.7% of the first blockchain asset's value. The system may then determine a respective slippage for each of the network routes in the first plurality of network routes. For example, as discussed above, some network routes may include multiple networks to "pass through" or transact with to obtain the first blockchain asset. The system may determine a respective slippage amount for each network route by adding slippage amounts of each network included in a given network route. For example, where a first network route includes a first network and a second network, the first network may be associated with a slippage of 0.2% and the second network may be associated with a slippage of 0.4%. As such, the total slippage of the first network route may be 0.6%. As another example, a second network route may only include a third network that is associated with a slippage of 0.9%. The system may filter the first plurality of network routes based on the respective maximum slippage. As an example, the system may generate the first subset of network routes by including the network routes that do not exceed the maximum slippage (e.g., as indicated by the first processing characteristic). Continuing with the example above, the first subset of the plurality of network routes may include the first network route (e.g., as the total slippage of the first network route is below that of the maximum slippage indicated by the first processing characteristic). By doing so, the system may determine the network routes that satisfy the maximum slippage amount—thereby improving the user experience as the user may not be required to "overpay" for the first blockchain asset due to the slippage of the asset's value.

In some embodiments, filtering the first plurality of network routes may be based on a throughput speed. For example, the system may filter the first plurality of network routes based on the first processing characteristic to generate the first subset of the first plurality of network routes by first determining a throughput requirement corresponding to the first processing characteristic. For instance, a user may want to obtain the blockchain asset as fast as possible, which, in volatile networks, may reduce the amount of slippage a given asset may experience. To accomplish this, the system may determine that the throughput requirement may be 6 tx/second (e.g., 6 transactions per second). The system may then determine the throughput speed for each of the network routes in the first plurality of network routes. For example, the system may add the throughput speed for each network in a given network route or may average the throughput speed for each network in a given network route to determine the throughput speed for each of the network routes in the first plurality of network routes. Upon determining the throughput speed for each network route in the first plurality of network routes, the system may filter the first plurality of network routes based on the throughput requirement to generate the first subset of the plurality of network routes. For example, each network route included in the first subset of the plurality of network routes may have a throughput speed that does not exceed the throughput requirement. By doing so, the system may reduce the effects of asset slippage by filtering the network routes based on the throughput requirement—thereby improving the user experience while reducing the cost of accessing blockchain assets.

In some embodiments, filtering the first plurality of network routes may be based on a batching requirement. For example, the system may filter the first plurality of network routes based on the first processing characteristic to generate the first subset of the plurality of network routes by first determining that the first processing characteristic requires batching the first blockchain operation. For instance, the first processing characteristic may comprise a user request to batch the first blockchain operation. Transaction batching comprises combining multiple blockchain operations into a single blockchain operation. By doing so, the blockchain operations are able to amortize the overhead cost of an individual operation across the multiple operations, which reduces the effective fee per operation. This has the added benefit of also reducing the load on the network as each new block has limited space available and batching allows for more operations in a smaller space.

Therefore, the system may filter the first plurality of network routes based on whether each of the network routes in the first plurality of network routes allows batching blockchain operations. For example, the system may determine that a network route allows batching based on the network(s) included in the network route. For instance, the system may refer to a database storing network-related information (e.g., such as whether a given network allows batching) or perform web scraping to determine whether a network allows batching. The system may determine that a network route allows batching based on (i) whether all the networks included in the network allows batching, or (ii) whether at least one network included in the network allows batching. Upon determining whether each network route of the first plurality of network routes allow batching, the system may generate the first subset of the plurality of network routes, where the first subset includes the network routes that allow batching. By doing so, as discussed above, the system may reduce the overhead cost of performing blockchain operations while reducing system latency and network load.

In some embodiments, filtering the first plurality of network routes may be based on a batching size requirement. For example, the system may filter the first plurality of network routes based on the first processing characteristic to generate the first subset of the plurality of network routes by first determining that the processing characteristic requires batching of the first blockchain operation into a batch of a first batch size. The processing characteristic may comprise a user request to batch the first blockchain operation in a batch of a given size. This may have the benefit of limiting fees to a particular amount. For example, the size of a batch may correspond to the overall fees (e.g., gas fees, transaction fees, or other fees associated with a transaction/batch) when a blockchain operation is performed. Although batching multiple blockchain operations reduces the cost of each individual operation when added together, the larger the batch, the larger the fees for that batch may be. By selecting a given size of a batch (e.g., a batch including 4 transactions, 6 transactions, 100 transactions etc.), the user may be able to control the fee associated with the given batch operation. Therefore, when the processing characteristic indicates a batch of a first batch size, the system may monitor for additional blockchain operations to include in the batch. For example, the user may want to access a second blockchain asset via a second network operation. As such, the system may monitor for other incoming blockchain operations to add to the batch. In some embodiments, the system may continue to monitor for other incoming blockchain operations until the batch satisfies the first batch size (e.g., the batch includes the indicated amount of operations for the batch). By doing so, the system may reduce network latency, load, and the cost of performing blockchain operations.

At step 612, process 600 (e.g., using one or more components described above) may generate a first recommendation. For example, the system may generate a first recommendation (e.g., on a first user device) for performing the first blockchain operations based on the first subset of the plurality of network routes. The first recommendation may be a suggestion indicating a set of network routes to take for accessing the first blockchain asset. As the recommendation is based on the first subset of the plurality of network routes (e.g., filtered network routes corresponding to the first processing characteristic, an ordered set of network routes, etc.), the recommendation may include one or more of the first subset of the plurality of network routes. For example, the recommendation may include a message indicating (i) a network route (e.g., the set of networks to access the blockchain asset), (ii) a price of the blockchain asset, (iii) fees associated with the blockchain operation (e.g., gas fees for each network, total gas fees, or other fees, blockchain platform service fee), (iv) the location of the blockchain asset (e.g., a network, a wallet, an entity, or other location), (v) a payment method (e.g., how the user will pay for the blockchain asset), (vi) the value of the blockchain asset, (vii) one or more user selectable options (e.g., "buy now," "trade," "access now," etc.), or other recommendation-related information. In some embodiments, the user may select one of the user selectable options to perform the blockchain operation (e.g., to access the first blockchain asset). By doing so (e.g., providing a recommendation), the system may provide a set of most efficient network routes for accessing a blockchain asset while improving the user experience and maintaining blockchain operation security (e.g., as the network routes are filtered based on a processing characteristic).

In some embodiments, the system may generate a second recommendation for performing the first blockchain operation. For example, the system may receive a second user request to apply a second processing characteristic. For instance, the user may want to access the first blockchain asset via a network route that not only includes a specific network, but is also below a maximum gas fee. Thus, the system may filter the first subset of the plurality of network routes based on the second processing characteristic (e.g., the maximum gas fee), to generate a second subset of the plurality of network routes. Based on the second subset of the plurality of network routes, the system may generate a second recommendation (e.g., on the first user device), for performing the first blockchain operation. By doing so, the system may further allow users to filter the network routes based on user selected characteristics—thereby improving the user experience.

In some embodiments, the system may generate the first recommendation based on known entities. For example, the system may retrieve a list of known entities and filter the first subset of the plurality of network routes based on the list of known entities. By filtering the first subset of the plurality of network routes based on the list of known entities (e.g., trusted entities, secure entities, favored entities, etc.), the system may generate a second subset of the plurality of network routes, where the first recommendation is further based on the second subset of the plurality of network routes. By doing so, the system may further filter the network routes to ensure that only known entities (or routes with known entities) are used, thereby improving the user experience and increasing blockchain operation security.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving a first user request to perform a first blockchain operation across one or more computer networks to access a first blockchain asset, wherein the one or more computer networks includes a decentralized computer network; determining a first processing characteristic for the first user request; determining a first plurality of locations of the first blockchain asset across the one or more computer networks; determining a first plurality of network routes to a first subset of the first plurality of locations; filtering the first plurality of network routes based on the first processing characteristic to generate a first subset of the plurality of network routes; and generating a first recommendation, on a first user device, for performing the first blockchain operation based on the first subset of the plurality of network routes.

2. The method of any one of the preceding embodiments, further comprising: receiving a second user request to apply a second processing characteristic; filtering the first subset of the plurality of network routes based on the second processing characteristic to generate a second subset of the plurality of network routes; and generating a second recommendation, on the first user device, for performing the first blockchain operation based on the second subset of the plurality of network routes.

3. The method of any one of the preceding embodiments, further comprising: retrieving a list of known entities; and filtering the first subset of the plurality of network routes based on the list of known entities to generate a second subset of the plurality of network routes, wherein the first recommendation is further based on the second subset of the plurality of network routes.

4. The method of any one of the preceding embodiments, further comprising: retrieving known entity labels validated by a blockchain platform service; and filtering the first plurality of locations based on the known entity labels for the first plurality of locations to generate the first subset of the first plurality of locations.

5. The method of any one of the preceding embodiments, wherein determining the first plurality of locations of the first blockchain asset across the one or more computer networks further comprises: determining an asset characteristic for the first blockchain asset; and comparing the asset characteristic to characteristics of available blockchain assets.

6. The method of any one of the preceding embodiments, wherein filtering the first plurality of network routes based on the first processing characteristic to generate the first subset of the plurality of network routes further comprises: determining a first network and a second network in the first plurality of network routes; and filtering the first network and the second network based on the first processing characteristic.

7. The method of any one of the preceding embodiments, wherein determining the first plurality of network routes to the first subset of the first plurality of locations further comprises: determining a plurality of networks for use in performing blockchain operations across the one or more computer networks; generating a plurality of orders of the plurality of networks to the first subset of the first plurality of locations; and filtering the plurality of orders based on the first processing characteristic.

8. The method of any one of the preceding embodiments, wherein determining the first plurality of network routes to the first subset of the first plurality of locations further comprises: determining a plurality of networks for use in performing blockchain operations across the one or more computer networks; generating a feature input based on the plurality of networks; inputting the feature input into an artificial intelligence model to generate an output; and determining the first plurality of network routes to the first subset of the first plurality of locations based on the output.

9. The method of any one of the preceding embodiments, wherein generating the feature input based on the plurality of networks further comprises: determining a plurality of network characteristics for the plurality of networks; and generating an array of values representing the plurality of network characteristics.

10. The method of any one of the preceding embodiments, wherein filtering the first plurality of network routes based on the first processing characteristic to generate the first subset of the plurality of network routes further comprising: ranking the first plurality of network routes based on the first processing characteristic to generate a plurality of rankings; and filtering the plurality of rankings based on a threshold ranking to determine the first subset of the plurality of network routes.

11. The method of any one of the preceding embodiments, wherein filtering the first plurality of network routes based on the first processing characteristic to generate the first subset of the plurality of network routes further comprises: determining a network corresponding to the first processing characteristic; and filtering the first plurality of network routes based on whether each of the network routes in the first plurality of network routes includes the network.

12. The method of any one of the preceding embodiments, wherein filtering the first plurality of network routes based on the first processing characteristic to generate the first subset of the plurality of network routes further comprises: determining a maximum gas fee requirement corresponding to the first processing characteristic; determining a respective maximum gas fee for each of the network routes in the first plurality of network routes; and filtering the first plurality of network routes based on the respective maximum gas fee.

13. The method of any one of the preceding embodiments, wherein filtering the first plurality of network routes based on the first processing characteristic to generate the first subset of the plurality of network routes further comprises: determining a maximum slippage requirement corresponding to the first processing characteristic; determining a respective slippage for each of the network routes in the first plurality of network routes; and filtering the first plurality of network routes based on the respective maximum slippage.

14. The method of any one of the preceding embodiments, wherein filtering the first plurality of network routes based on the first processing characteristic to generate the first subset of the plurality of network routes further comprises: determining a throughput requirement corresponding to the first processing characteristic; determining a respective throughput speed for each of the network routes in the first plurality of network routes; and filtering the first plurality of network routes based on the respective throughput speed.

15. The method of any one of the preceding embodiments, wherein filtering the first plurality of network routes based on the first processing characteristic to generate the first subset of the plurality of network routes further comprises: determining that the first processing characteristic requires batching the first blockchain operation; and filtering the first plurality of network routes based on whether each of the network routes in the first plurality of network routes allows batching blockchain operations.

16. The method of any one of the preceding embodiments, wherein filtering the first plurality of network routes based on the first processing characteristic to generate the first subset of the plurality of network routes further comprises: determining that the first processing characteristic requires batching the first blockchain operation into a batch of a first batch size; and monitoring for additional blockchain operations to include in the batch.

17. The method of any one of the preceding embodiments, wherein determining the first plurality of network routes to the first subset of the first plurality of locations further comprises: determining a first plurality of networks for use in performing blockchain operations across the one or more computer networks; determining a second plurality of networks for use in performing blockchain operations across the one or more computer networks; and prioritizing use of the first plurality of networks to determine the first plurality of network routes to the first subset of the first plurality of locations.

18. A tangible, non-transitory, machine-readable medium storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for recommending network processing routes when conducting blockchain operations, the system comprising:

one or more processors and non-transitory media storing instructions that, when executed by the one or more processors, cause operations comprising:

receiving a user request to access a blockchain asset, wherein accessing the blockchain asset involves performing one or more blockchain operations across one or more computer networks that includes a decentralized computer network;

in response to detecting a wrapping characteristic for the user request, filtering, based on the wrapping characteristic and a speed or network resource cost characteristic indicated by the user request, a plurality of network routes to generate one or more network routes, involving wrapping, to one or more blockchain locations of a plurality of potential blockchain locations for the blockchain asset, wherein filtering the plurality of network routes comprises including the one or more network routes as a recommended set for accessing the blockchain asset in lieu of one or more other network routes of the plurality of network routes based on (i) the speed or network resource cost characteristic indicated by the user request and (ii) a prediction of the one or more network routes, involving wrapping, being faster or utilizing less network resources than the one or more other network routes; and generating, and displaying on a user device, based on the one or more network routes involving wrapping, a recommendation for accessing the blockchain asset.

2. A method for recommending network processing routes when conducting blockchain operations, the method comprising:

receiving a first user request to access a first blockchain asset;

detecting a wrapping or bridging characteristic for the first user request;

filtering, based on the wrapping or bridging characteristic and a speed or network resource cost characteristic indicated by the first user request, a plurality of network routes to generate a first subset of network routes to a first subset of a first plurality of locations for the first blockchain asset, wherein filtering the plurality of network routes comprises including the first subset of network routes as a recommended set for accessing the first blockchain asset in lieu of one or more other network routes of the plurality of network routes based on (i) the speed or network resource cost characteristic indicated the first user request and (ii) a prediction of the first subset of network routes being faster or utilizing less network resources than the one or more other network routes; and generating a first recommendation, on a first user device, for accessing the first blockchain asset based on the first subset of network routes.

3. The method of claim 2, further comprising:

executing, based on the first recommendation for accessing the first blockchain asset, a set of blockchain operations, involving (i) wrapping a blockchain token to access the first blockchain asset and (ii) one or more calls to one or more smart contracts on one or more blockchains, corresponding to the first subset of network routes.

4. The method of claim 2, further comprising:

executing, based on the first recommendation for accessing the first blockchain asset, a set of blockchain operations, involving (i) wrapping a blockchain token to access the first blockchain asset and (ii) a plurality of calls respectfully to a plurality of smart contracts that are subject to different blockchain token protocols, corresponding to the first subset of network routes.

5. The method of claim 2, further comprising:

retrieving known entity labels validated by a blockchain platform service; and filtering the first plurality of locations based on the known entity labels for the first plurality of locations to generate the first subset of the first plurality of locations.

6. The method of claim 2, wherein filtering the plurality of network routes comprises including the first subset of network routes as a recommended set for accessing the first blockchain asset in lieu of the one or more other network routes based on (i) a speed characteristic indicated the first user request and (ii) a prediction of the first subset of network routes being faster than the one or more other network routes.

7. The method of claim 2, wherein filtering the plurality of network routes comprises including the first subset of network routes as a recommended set for accessing the first blockchain asset in lieu of the one or more other network routes based on (i) a network resource cost characteristic indicated the first user request and (ii) a prediction of the first subset of network routes utilizing less network resources than the one or more other network routes.

8. The method of claim 2, further comprising:

determining a plurality of networks for use in performing blockchain operations across one or more computer networks;

generating a plurality of orders of the plurality of networks to the first subset of the first plurality of locations; and filtering the plurality of orders based on the wrapping or bridging characteristic.

9. The method of claim 2, further comprising:

determining a plurality of networks for use in performing blockchain operations across one or more computer networks;

generating a feature array representing a plurality of network characteristics of the plurality of networks; and inputting the feature array into an artificial intelligence model to determine the plurality of network routes to the first subset of the first plurality of locations.

10. The method of claim 2, wherein filtering the plurality of network routes comprises including the first subset of network routes as a recommended set for accessing the first blockchain asset in lieu of the one or more other network routes based on (i) the speed or network resource cost characteristic indicated the first user request, (ii) a prediction of the first subset of network routes being faster or utilizing less network resources than the one or more other network routes, and (iii) a determination, in connection with a batching requirement indicated by the first user request, that each network route in the first subset of network routes allows batching blockchain operations.

11. The method of claim 2, wherein filtering the plurality of network routes comprises including the first subset of network routes as a recommended set for accessing the first blockchain asset in lieu of the one or more other network routes based on (i) the speed or network resource cost characteristic indicated the first user request, (ii) a prediction of the first subset of network routes being faster or utilizing less network resources than the one or more other network routes, and (iii) a determination, in connection with a batching size requirement indicated by the first user request, that each network route in the first subset of network routes allows batching blockchain operations into a batch size corresponding to the batching size requirement.

12. The method of claim 2, wherein filtering the plurality of network routes comprises selecting, based on a wrapping characteristic indicated by the first user request, one or more first network routes involving a first wrapping network over one or more second network routes involving a second wrapping network different from the first wrapping network to generate the first subset of network routes.

13. One or more non-transitory computer-readable media comprising instructions that when executed by one or more processors causes operations comprising:

receiving a user request to access a blockchain asset;

detecting a wrapping or bridging characteristic for the user request;

filtering, based on the wrapping or bridging characteristic and a speed or network resource cost characteristic indicated by the user request, a plurality of network routes to generate one or more network routes, involving wrapping or bridging, to one or more blockchain locations of a plurality of blockchain locations for the blockchain asset, wherein filtering the plurality of network routes comprises including the one or more network routes as a recommended set for accessing the blockchain asset in lieu of one or more other network routes of the plurality of network routes based on (i) the speed or network resource cost characteristic indicated by the user request and (ii) a prediction of the one or more network routes being faster or utilizing less network resources than the one or more other network routes; and generating, and displaying on a user device, based on the one or more network routes involving wrapping or bridging, a recommendation for accessing the blockchain asset.

14. The one or more non-transitory computer-readable media of claim 13, the operations further comprising:

executing, based on the recommendation for accessing the blockchain asset, a set of blockchain operations, involving (i) wrapping a blockchain token to access the blockchain asset and (ii) one or more calls to one or more smart contracts on one or more blockchains, corresponding to the one or more network routes.

15. The one or more non-transitory computer-readable media of claim 13, the operations further comprising:

executing, based on the recommendation for accessing the blockchain asset, a set of blockchain operations, involving (i) wrapping a blockchain token to access the blockchain asset and (ii) one or more calls to one or more smart contracts on one or more blockchains, corresponding to the one or more network routes.

16. The one or more non-transitory computer-readable media of claim 13, the operations further comprising:

executing, based on the recommendation for accessing the blockchain asset, a set of blockchain operations, involving (i) wrapping a blockchain token to access the blockchain asset and (ii) a plurality of calls respectfully to a plurality of smart contracts that are subject to different blockchain token protocols, corresponding to the one or more network routes.

17. The one or more non-transitory computer-readable media of claim 13, wherein filtering the plurality of network routes comprises including the one or more network routes as a recommended set for accessing the blockchain asset in lieu of the one or more other network routes based on (i) a speed characteristic indicated by the user request and (ii) a prediction of the one or more network routes, involving wrapping or bridging, being faster than the one or more other network routes.

18. The one or more non-transitory computer-readable media of claim 13, wherein filtering the plurality of network routes comprises including the one or more network routes as a recommended set for accessing the blockchain asset in lieu of the one or more other network routes based on (i) a network resource cost characteristic indicated by the user request and (ii) a prediction of the one or more network routes, involving wrapping or bridging, utilizing less network resources than the one or more other network routes.

19. The one or more non-transitory computer-readable media of claim 13, wherein filtering the plurality of network routes comprises selecting, based on a wrapping characteristic indicated by the user request, the one or more network routes involving a first wrapping network over a second subset of network routes involving a second wrapping network different from the first wrapping network to generate the one or more network routes.

* * * * *